US012623845B2

(12) United States Patent
Ichiki

(10) Patent No.: US 12,623,845 B2
(45) Date of Patent: May 12, 2026

(54) UNMANNED CONVEYING APPARATUS

(71) Applicant: SHINANO KENSHI KABUSHIKI KAISHA, Nagano (JP)

(72) Inventor: Koichi Ichiki, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 691 days.

(21) Appl. No.: 17/948,435

(22) Filed: Sep. 20, 2022

(65) Prior Publication Data

US 2023/0159276 A1 May 25, 2023

(30) Foreign Application Priority Data

Nov. 25, 2021 (JP) ................................ 2021-191464

(51) Int. Cl.
*B65G 1/137* (2006.01)

(52) U.S. Cl.
CPC .................................. *B65G 1/1375* (2013.01)

(58) Field of Classification Search
CPC .................................................... B65G 1/1375
See application file for complete search history.

(56) References Cited

U.S. PATENT DOCUMENTS 2,072,787 A * 3/1937 Anderson ................. B60G 5/02
280/81.6
8,262,125 B2 * 9/2012 Sergison .................. B60G 5/02
280/682

2020/0079171 A1 * 3/2020 Liu .......................... B60G 9/02
2023/0159276 A1 * 5/2023 Ichiki ................... B65G 1/1375
700/218

FOREIGN PATENT DOCUMENTS

| CN | 215062811 U | * 12/2021 | ............. B60B 33/00 |
| JP | 2005313720 | 11/2005 | |
| JP | 2007-308095 | 11/2007 | |
| JP | 2020-513375 | 5/2020 | |
| JP | 2021017309 | 2/2021 | |

OTHER PUBLICATIONS

Office Action dated Aug. 22, 2023 in Japanese Application No. 2021-191464.

* cited by examiner

*Primary Examiner* — Kyle O Logan
(74) *Attorney, Agent, or Firm* — Stephen J. Weyer, Esq.; Stites & Harbison, PLLC

(57) ABSTRACT

To provide an unmanned conveying apparatus that achieves low flooring of a vehicle body and enlarges a placing space for a load and is capable of stably traveling without driving wheels rising even if an inclination or unevenness is present on a traveling surface. There is provided an unmanned conveying apparatus that is loaded with a load on a loading section supported by a base section and travels and conveys the load to a designated point. First auxiliary wheels and driving wheels are respectively supported by a first wheel supporting section. The first wheel supporting section is swingably supported, via a swinging shaft, by a swing supporting section provided in the base section.

1 Claim, 8 Drawing Sheets

FIG. 1

UNMANNED CONVEYING APPARATUS

CROSS-REFERENCE TO RELATED APPLICATION

This application is based upon and claims the benefit of priority of the prior Japanese Patent Application No. 2021-191464, filed on Nov. 25, 2021, and the entire contents of which are incorporated herein by reference.

TECHNICAL FIELD

The present invention relates to an unmanned conveying apparatus that is loaded with a load on a loading section supported by a base section and conveys the load to a designated point.

BACKGROUND ART

In a manufacturing site or the like, an unmanned conveying apparatus is used to convey components and the like between processes in an unmanned manner and carrying the components and the like into a warehouse. In the manufacturing site, since a layout change due to a process change is frequently performed and various manufacturing apparatuses are disposed, a conveyance line is narrow and a route tends to be complicated. Therefore, an unmanned conveying apparatus, in particular, an AMR (Autonomous Mobile Robot) that can turn in a small circle and is easily introduced into an existing factory is attracting attention.

An apparatus explained below has been proposed as an unmanned conveying apparatus.

The apparatus includes a truck main body including a traveling driving section, a placing table on which a load is placed, a rotating device that rotates the placing table centering on an axis in an up-down direction, and a controller that controls a carrier. The placing table and the rotating device are supported to be capable of rising and falling with respect to the truck main body. Two driving wheels arranged on the left and the right are disposed in the center of the truck main body. Driven wheels (caster wheels) are disposed in the front and the rear of the two driving wheels. The driven wheels in the front and the rear are, for example, respectively disposed one by one on the left and the right. Positional deviation of the load placed on the placing table is detected by a camera attached to the truck main body upward and a movement of the carrier is restricted (PTL 1: JP-A-2021-17309).

However, the unmanned conveying apparatus is disposed in various environments. A traveling surface is not always a flat surface and is sometimes an incline surface or an uneven surface. For example, if the traveling surface is inclined, the front and rear driven wheels are grounded but the driving wheels in the center rise and the unmanned conveying apparatus is likely to be unable to travel when entering the traveling surface. Accordingly, a wheel-type traveling apparatus explained below has been proposed. A first wheel supporting section that supports both of driving wheels and auxiliary wheels and a second wheel supporting section that supports only the auxiliary wheels are rotatably coupled in a vertical direction. The driving wheels and the auxiliary wheels are disposed in positions where the driving wheels and the auxiliary wheels can self-stand. Only one or a plurality of auxiliary wheels arranged in a lateral direction are disposed to be independently unable to self-stand on the second wheel supporting section. A load is placed on and a weight is applied to the second wheel supporting section. A coupling section of the first wheel supporting section and the second wheel supporting section is set in a middle position between the driving wheels and the auxiliary wheels on the first wheel supporting section. Therefore, irrespective of whichever of the first and second wheel supporting sections a weight is applied to, a pressing force to a traveling road is applied to both of the driving wheels and the auxiliary wheels in the first wheel supporting section. Consequently, irrespective of whichever of the front and the rear of the first wheel supporting section a bent section of an inclined surface is disposed in, it is guaranteed that the driving wheels are grounded at a predetermined pressure. Therefore, an untravellable state and a tumble due to a steep slope climb are prevented (PTL 2: JP-A-2005-313720).

CITATION LIST

Patent Literature

PTL 1: JP-A-2021-17309
PTL 2: JP-A-2005-313720

SUMMARY OF INVENTION

Technical Problem

However, in the unmanned conveying apparatus of PTL 1 explained above, the placing table and the rotating device are supported by the truck main body to be capable of rising and falling. In the unmanned conveying apparatus of PTL 2, the first wheel supporting section that supports both of the driving wheels and the auxiliary wheels and the second wheel supporting section that supports only the auxiliary wheels are coupled in the vertical direction to be capable of rotating. Therefore, both of the unmanned conveying apparatus have large vehicle heights. Loads placed on the placing table and the second wheel supporting section are likely to be collapsed when the unmanned conveying apparatuses travel on a slope or an uneven surface. In the unmanned conveying apparatus of PTL 2, the first wheel supporting section and the second wheel supporting section are rotatably coupled in the height direction. Therefore, a placing space for a load is limited.

Solution to Problem

The present invention has been devised to solve these problems, and an object of the present invention is to provide an unmanned conveying apparatus that achieves low flooring of a vehicle body and enlarges a placing space for a load and is capable of stably traveling without driving wheels rising even if an inclination or unevenness is present on a traveling surface.

The present invention has the following configuration in order to achieve the object.

An unmanned conveying apparatus that is loaded with a load on a loading section supported by a base section and travels and conveys the load to a designated point, the unmanned conveying apparatus including: a pair of driving wheels driven to rotate by driving motors; a pair of first auxiliary wheels respectively turnably supported by a first wheel supporting section provided on one end side of the base section centering on the driving wheels; and a pair of second auxiliary wheels respectively turnably supported by a second wheel supporting section provided on another end side of the base section, wherein the first auxiliary wheels and the driving wheels are respectively supported by the first wheel supporting section, and the first wheel supporting section is swingably supported by the base section between the loading section and the base section.

In this way, the first wheel supporting section that supports the first auxiliary wheels and the driving wheels are swingably supported by the base section. Therefore, the unmanned conveying apparatus is capable of stably travel without the driving wheels rising even if an inclination or unevenness is present on a traveling surface. Since the first wheel supporting section is disposed between the loading section and the base section, it is possible to achieve low flooring of a vehicle body. It is possible to widely use the loading section supported by the base section for load loading.

It is preferable that the first auxiliary wheels are turnably supported on one end side of the first wheel supporting section, the driving wheels are rotatably supported on another end side of the first wheel supporting section, and the first wheel supporting section is swingably axially supported, via a swinging shaft, by a swing supporting section provided on the base section.

Consequently, even if an inclination or unevenness is present on the traveling surface, the first wheel supporting section swings via the swinging shaft while the driving wheels are kept grounded and the first auxiliary wheels follow the traveling surface. Therefore, the unmanned conveying apparatus is capable of stably traveling without the driving wheels becoming incapable of traveling.

It is preferable that the swinging shaft is provided between the first wheel supporting section and the base section.

Consequently, the first wheel supporting section swings using a space between the base section and the loading section. Therefore, it is possible to suppress a vehicle height and achieve low flooring.

The first wheel supporting section may be swingably supported by the base section such that a distance from a swinging shaft position to a driving wheel side end position is longer than a distance from the swinging shaft position to a first auxiliary wheel side end position on the first wheel supporting section.

Consequently, a weight is always more easily applied to the driving wheel side compared with the first auxiliary wheel side. Therefore, it is possible to maintain a grounded state of the driving wheels and realize stable traveling.

An imaging camera and a laser distance sensor may be provided in the base section, and the unmanned conveying apparatus may autonomously travel while simultaneously performing environmental map creation and own-position estimation with inputs from the imaging camera and the laser distance sensor.

In this case as well, it is possible to apply an SLAM (Simultaneous Localization and Mapping: simultaneous execution of own-position estimation and environmental map creation) technique and improve reliability of an autonomous conveying operation while securing a wide space of the loading section on which a load is loaded.

Advantageous Effects of Invention

It is possible to provide an unmanned conveying apparatus that achieves low flooring of a vehicle body and enlarges a placing space for a load and is capable of stably traveling without driving wheels rising even if an inclination or unevenness is present on a traveling surface.

BRIEF DESCRIPTION OF DRAWINGS

FIG. 1 is a perspective view of an unmanned conveying apparatus.

DESCRIPTION OF EMBODIMENTS

A schematic configuration of an unmanned conveying apparatus according to the present invention is explained below with reference to FIGS. 1 to 7. The unmanned conveying apparatus is a trackless vehicle that is loaded with a load on a loading section by an operator or automatically, travels to a designated place, and is unloaded with the load by the operator or automatically. The unmanned conveying apparatus is equipped with SLAM (Simultaneous Localization and Mapping: simultaneous execution of own-position estimation and environmental map creation). The SLAM is roughly classified into three types according to differences of input sensors. There are LiDER SLAM in which an LiDAR (a laser distance sensor) is used as an input, Visual SLAM in which an imaging camera is used, and Depth SLAM in which distance measurement information from a ToF sensor or the like is used. As explained below, the unmanned conveying apparatus in this embodiment improves reliability of an autonomous conveying operation by using coordinate information by the LiDAR (the laser distance sensor) and image information of the imaging camera in combination.

Figure 2:
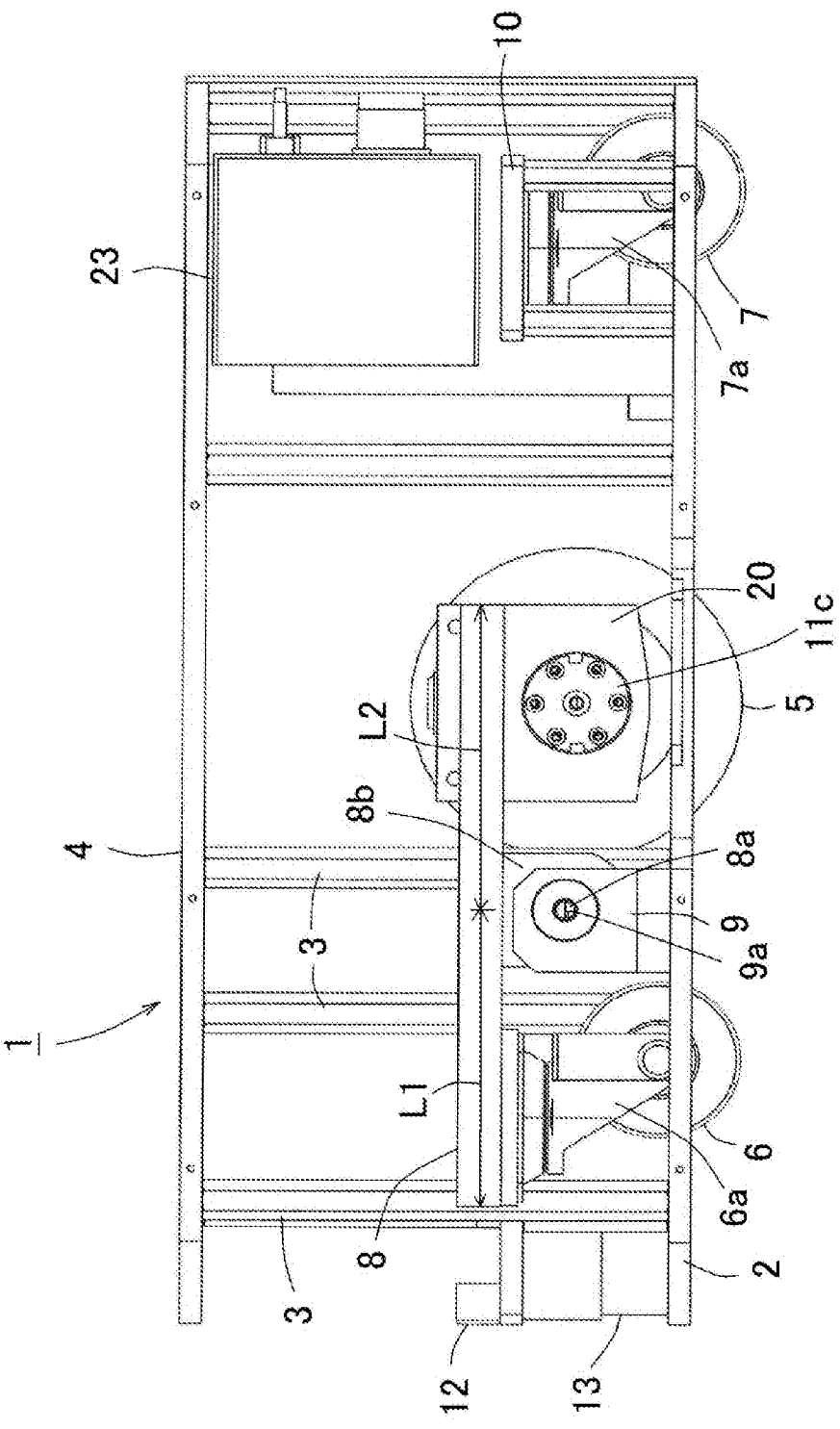
FIG. 2 is a side view of the unmanned conveying apparatus shown in FIG. 1 from which a right side plate and driving wheels are removed.

First, as shown in FIG. 2, in an unmanned conveying apparatus 1, a loading section 4 is supported by a base section 2 via columns 3. On both the left and right sides of the base section 2, a pair of driving wheels 5 is provided in the center. Six wheels in total including a pair of first auxiliary wheels 6 (front wheels) and a pair of second auxiliary wheels 7 (rear wheel) are provided in the front and the rear of the pair of driving wheels 5 (see FIG. 6).

Figure 5:
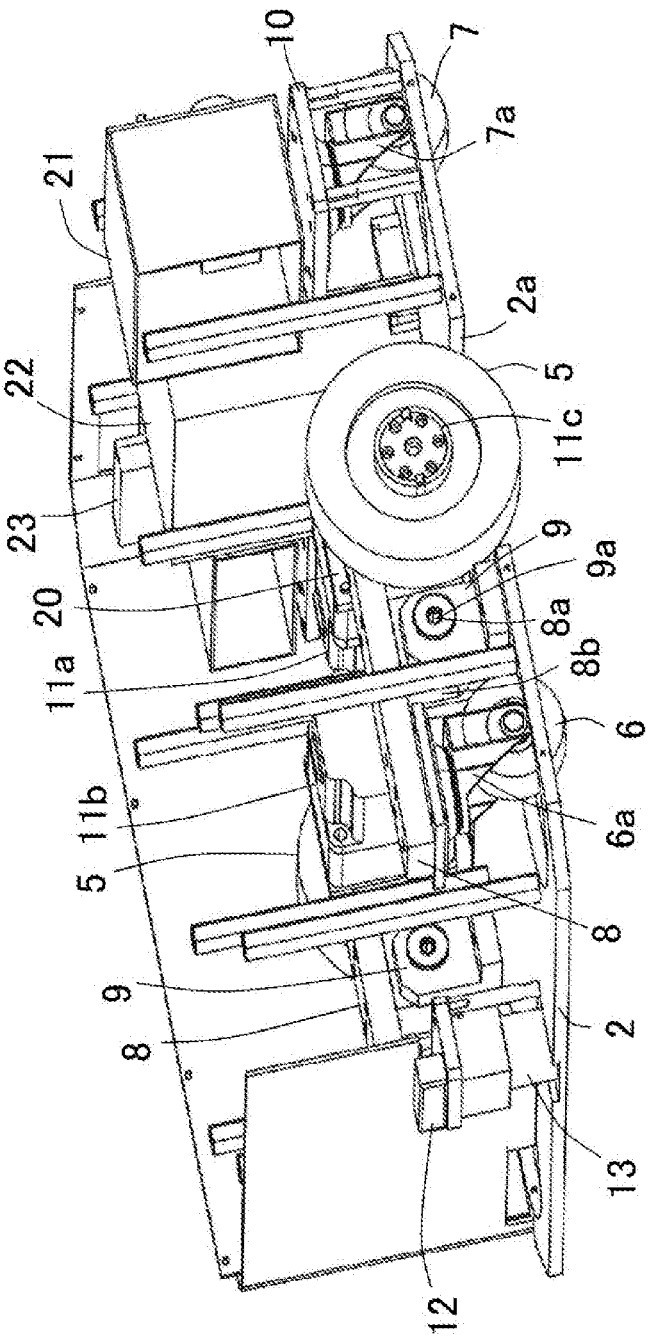
FIG. 5 is a perspective view of the unmanned conveying apparatus shown in FIG. 3 from which a loading section is removed.

As shown in FIG. 5, the pair of driving wheels 5 is respectively driven to rotate by driving motors 11a, 11b. In the base section 2, centering on the pair of driving wheels 5, a pair of auxiliary wheels 6 is respectively provided on one end side (a front side) of the base section 2 and a pair of second auxiliary wheels 7 is respectively provided on the other end side (a rear side) of the base section 2.

As shown in FIG. 2, the first auxiliary wheel 6 (the front wheel) is turnably supported by a caster 6a on one end side of an elongated plate-like first wheel supporting section 8. The driving motor 11a is integrally assembled to a motor attachment plate 20 on the other end side of the first wheel supporting section 8. A driving shaft 11c of the driving motor 11*a* is extended further to an outer side than the motor attachment plate 20. The driving wheel 5 is fit in the driving shaft 11*c*.

The first wheel supporting section 8 is swingably supported, via a swinging shaft 8*a*, by a swing supporting section 9 provided in the base section 2 between the loading section 4 and the base section 2. The swing supporting section 9 is protrudingly provided in the base section 2. A shaft hole 9*a* is bored in the swing supporting section 9. A shaft supporting plate 8*b* is protrudingly provided on an opposed surface of the first wheel supporting section 8 opposed to the base section 2. The swinging shaft 8*a* is protrudingly provided in the horizontal outward direction in the shaft supporting plate 8*b*. The swinging shaft 8*a* of the first wheel supporting section 8 is fit in the shaft hole 9*a* of the swing supporting section 9. The first wheel supporting section 8 is supported to be capable of swinging centering on the swinging shaft 8*a*.

Figures 8A, 8B, 8C:
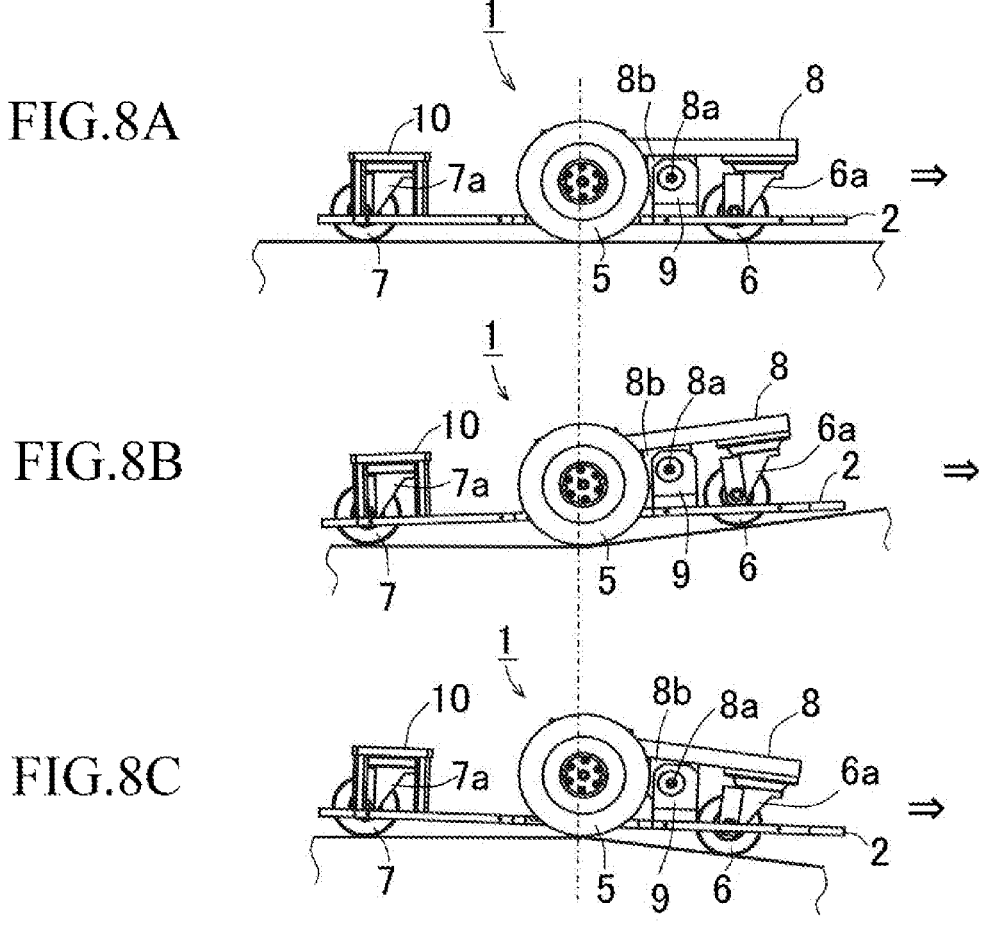
FIGS. 8A to 8C are state diagrams illustrating traveling operations corresponding to traveling surfaces of the unmanned conveying apparatus.

Traveling operations of the unmanned conveying apparatus 1 corresponding to traveling surfaces are explained with reference to FIGS. 8A to 8C. Only a configuration of a main part of the unmanned conveying apparatus 1 is shown. It is assumed that the unmanned conveying apparatus 1 is traveling toward the right side in FIGS. 8A to 8C. FIG. 8A shows a traveling state of the unmanned conveying apparatus 1 in the case in which a traveling surface is a flat land. The first wheel supporting section 8 and the base section 2 are parallel. All the wheels are grounded on the traveling surface.

FIG. 8B shows a traveling state of the unmanned conveying apparatus 1 in the case in which a traveling surface is an uphill road. The first wheel supporting section 8 swings upward to the right centering on the swinging shaft 8*a* with respect to the base section 2 and all the wheels are grounded on the traveling surface. FIG. 8C shows a traveling state of the unmanned traveling apparatus 1 in the case in which a traveling surface is a downhill road. The first wheel supporting section 8 swings downward to the right centering on the swinging shaft 8*a* with respect to the base section 2 and all the wheels are grounded on the traveling surface.

As it is seen with reference to FIGS. 8A to 8C, the first wheel supporting section 8 that supports the first auxiliary wheels 6 and the driving wheels 5 is swingably supported, via the swinging shaft 8*a*, by the swing supporting section 9 provided in the base section 2. Therefore, since the first wheel supporting section 8 swings on the base section 2 and the first auxiliary wheels 6 follow a traveling surface even if an inclination or unevenness is present on the traveling surface, the driving wheels 5 are kept grounded and the unmanned conveying apparatus 1 does not become incapable of traveling and is capable of smoothly climbing over a step section and an inclined surface and stably travel. Since the first wheel supporting section 8 is disposed between the loading section 4 and the base section 2, it is possible to achieve low flooring of a vehicle body. It is possible to widely use the loading section 4 supported by the base section 2 for load loading.

Since the swinging shaft 8*a* is provided between the first wheel supporting section 8 and the base section 2, the first wheel supporting section 8 swings using a space between the base section 2 and the loading section 4. Therefore, it is possible to suppress a vehicle height and achieve low flooring.

The first wheel supporting section 8 is supported with respect to the base section 2 such that a distance L2 from the position of the swinging shaft 8*a* to the end position on the driving wheel 5 side is longer than a distance L1 from the position of the swinging shaft 8*a* to the end position on the first auxiliary wheel 6 side on the first wheel supporting section 8 (L1<L2). Consequently, since a large weight is always easily applied to the driving wheel 5 side compared with the first auxiliary wheel 6 side, it is easy to maintain a grounded state of the driving wheels 5.

The second auxiliary wheels 7 are respectively turnably supported by casters 7*a* in second wheel supporting sections 10 provided on the left and the right of the base section 2. Both of the first auxiliary wheels 6 and the second auxiliary wheels 7 are driven wheels attached with casters and are configured to turn according to a difference between rotating speeds of the left and right driving wheels 5 and turn in a small circle. In this embodiment, a minimum rotation diameter is 800 mm and a 360° turn is possible.

Figure 1:
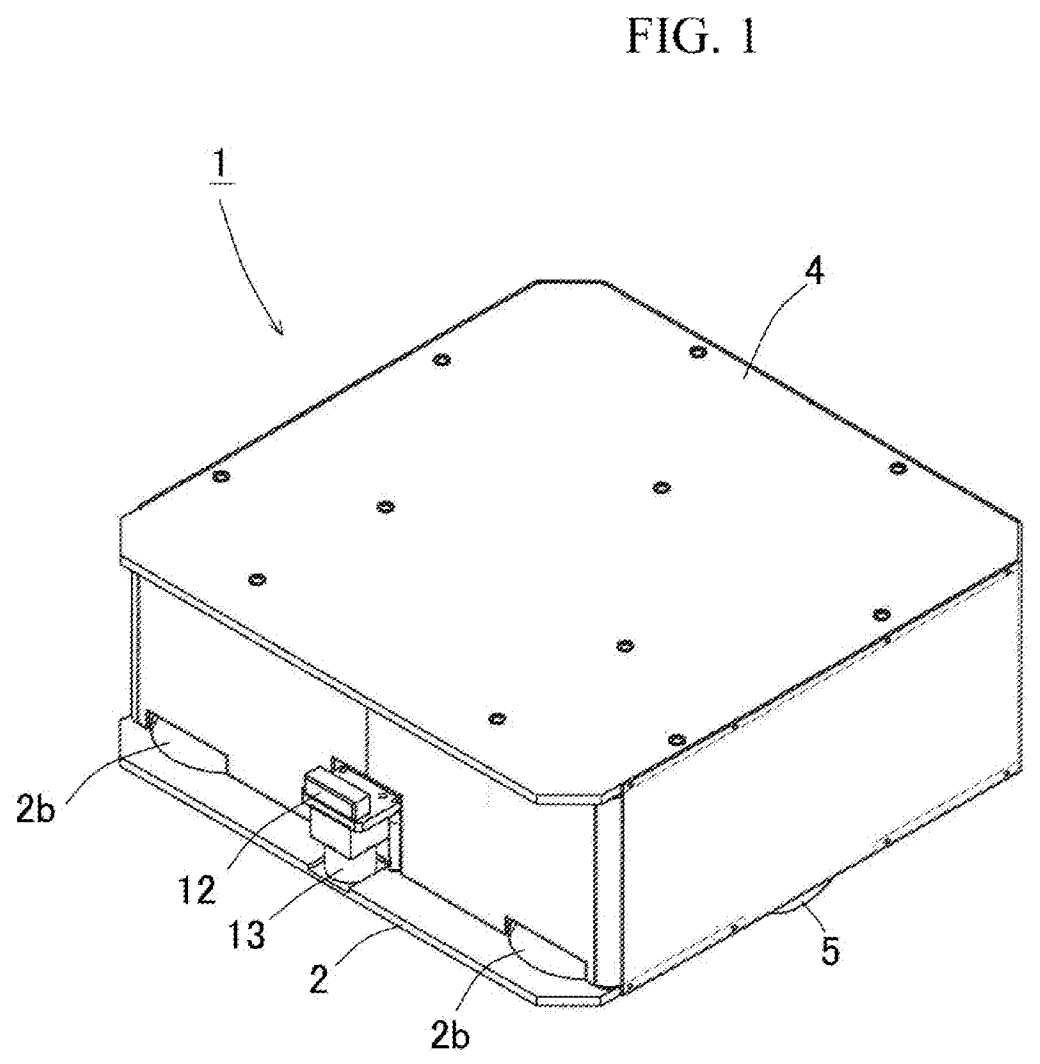
Figure 3:
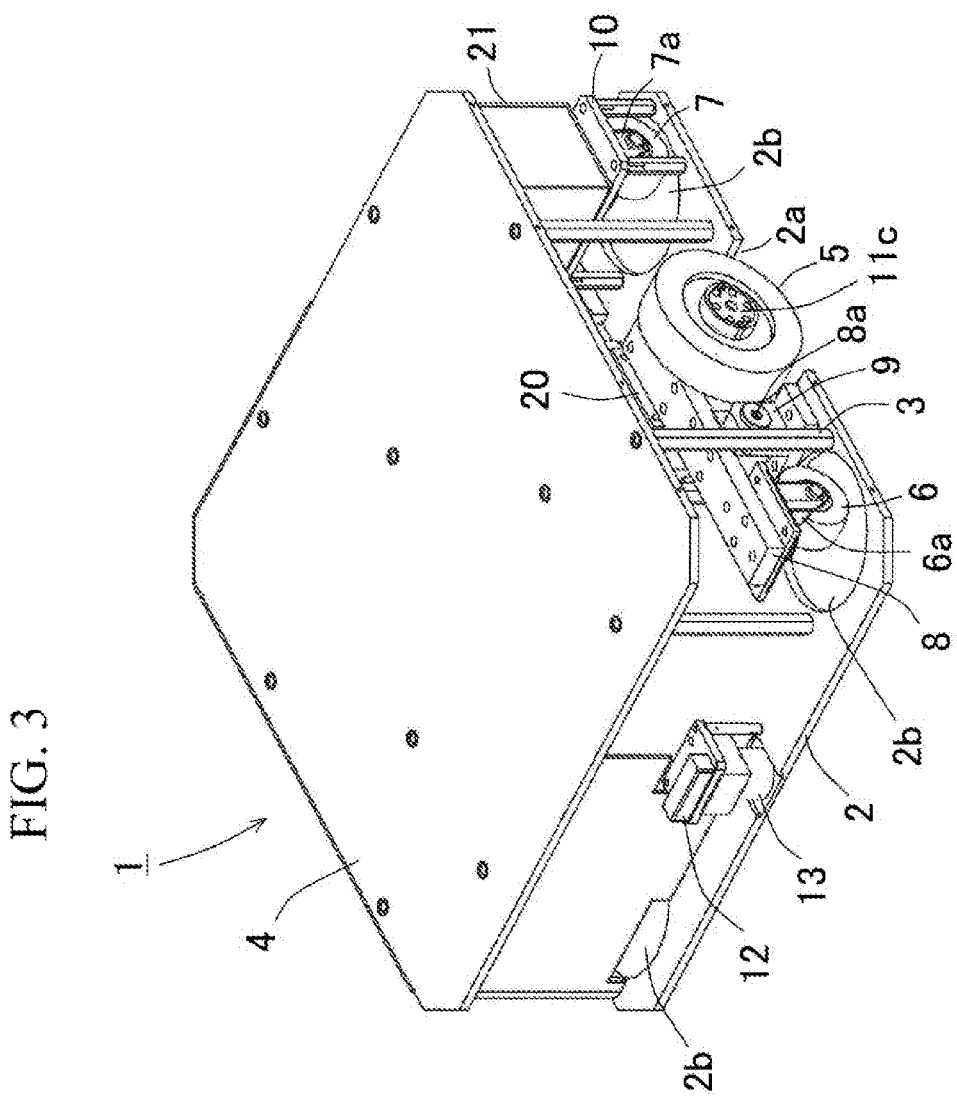
FIG. 3 is a perspective view of the unmanned conveying apparatus shown in FIG. 1 from which the right side plate and a front side plate are removed.
Figure 4:
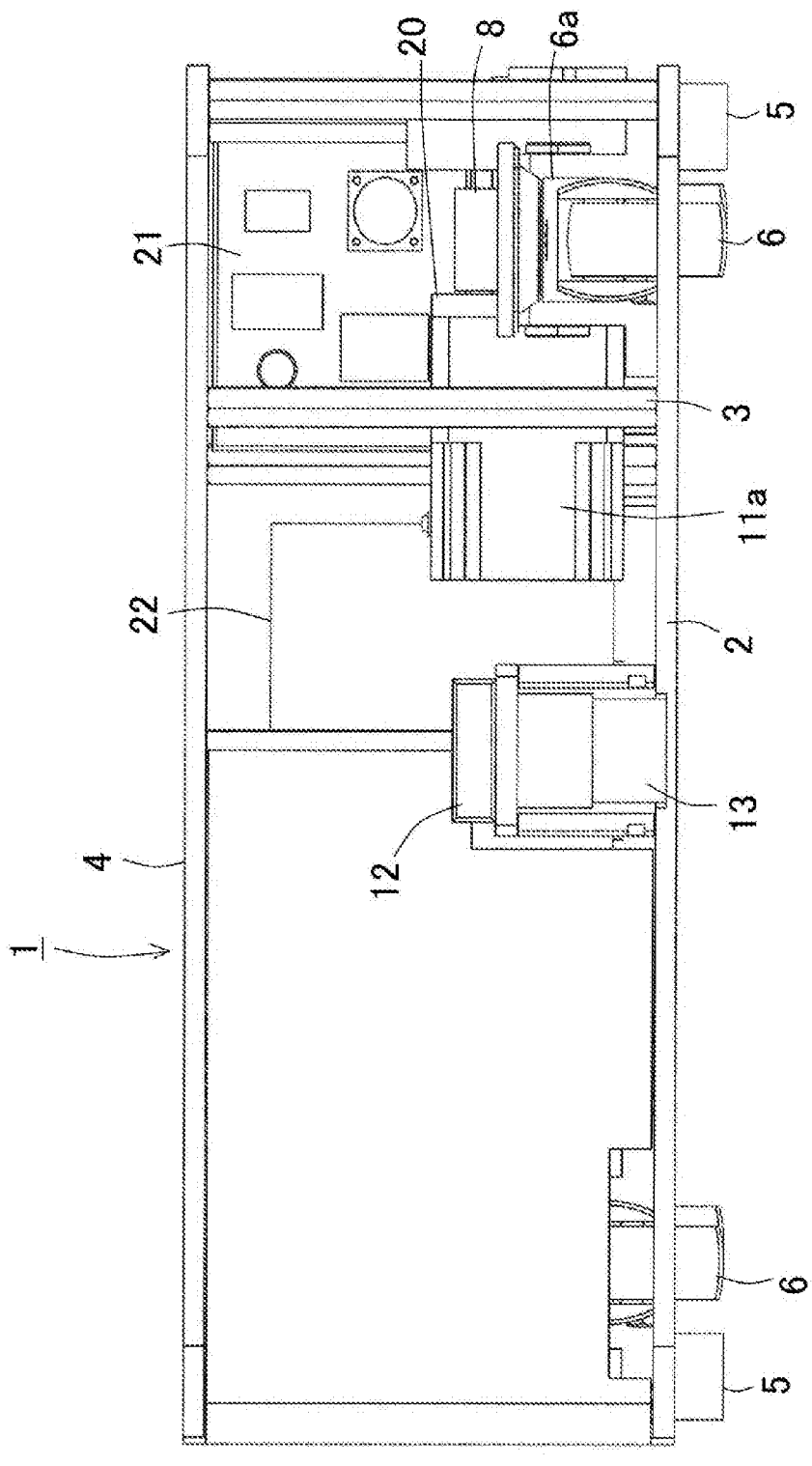
FIG. 4 is a front view of the unmanned conveying apparatus shown in FIG. 3.

As shown in FIG. 3, in the base section 2, cutouts 2*a* and bored holes 2*b* are provided in positions where the driving wheels 5, the first auxiliary wheels 6 (the front wheels), and the second auxiliary wheels 7 (the rear wheels) are provided and low flooring of the unmanned conveying apparatus 1 is achieved. As shown in FIG. 1, a load is loaded, by the operator or automatically, on a flat surface of the loading section 4 supported by the base section 2.

As shown in FIG. 2, the pair of driving wheels 5 is coupled to the driving shafts 11*c* of the driving motors 11*a*, 11*b* and driven to rotate. As explained below, motor rotation sensors 16*a*, 16*b* are respectively provided in the driving motors 11*a*, 11*b*. When movement accuracy is further improved, rotary encoders (not shown) may be provided in the driving motors 11*a*, 11*b* (see FIG. 7). Rotating speeds and rotating positions of the left and right driving wheels 5 are transmitted to a control unit explained below by rotation signals of the motors.

An imaging camera 12 (a camera for grasping environment) is provided in the front of the base section 2. The imaging camera 12 images a peripheral environment and reads a two-dimensional code and the like. The imaging camera 12 detects upper and lower obstacles that a laser distance sensor 13 explained below cannot capture. As a type of the imaging camera 12, a single lens camera (a wide angle camera, a fish-eye camera, or an omnidirectional camera), a compound eye camera (a stereo camera or a multicamera), an RGB-D camera (a depth camera or a ToF camera), or the like is used. In this embodiment, the stereo camera is used.

It is preferable that the imaging camera 12 is provided in a height position in a projection surface of the loading section 4 and between the base section 2 and the loading section 4. Consequently, a space above the loading section 4 can be widely used as a space for loading a load, contributing to low flooring of the unmanned conveying apparatus 1.

A laser distance sensor 13 (LiDAR) is provided below the imaging camera 12. The laser distance sensor 13 measures a distance to a target object with a difference in a time until reflected light of laser light irradiated from a laser scanner is received. The laser distance sensor 13 irradiates laser light to acquire point group data of 3D (x, y, and z coordinates) and creates an environmental map. The created environmental map is stored in a data storing unit 14*c* of a control unit 14 described below and used to estimate a position and detect an obstacle when the unmanned conveying apparatus 1 conveys a load.

Figure 6:
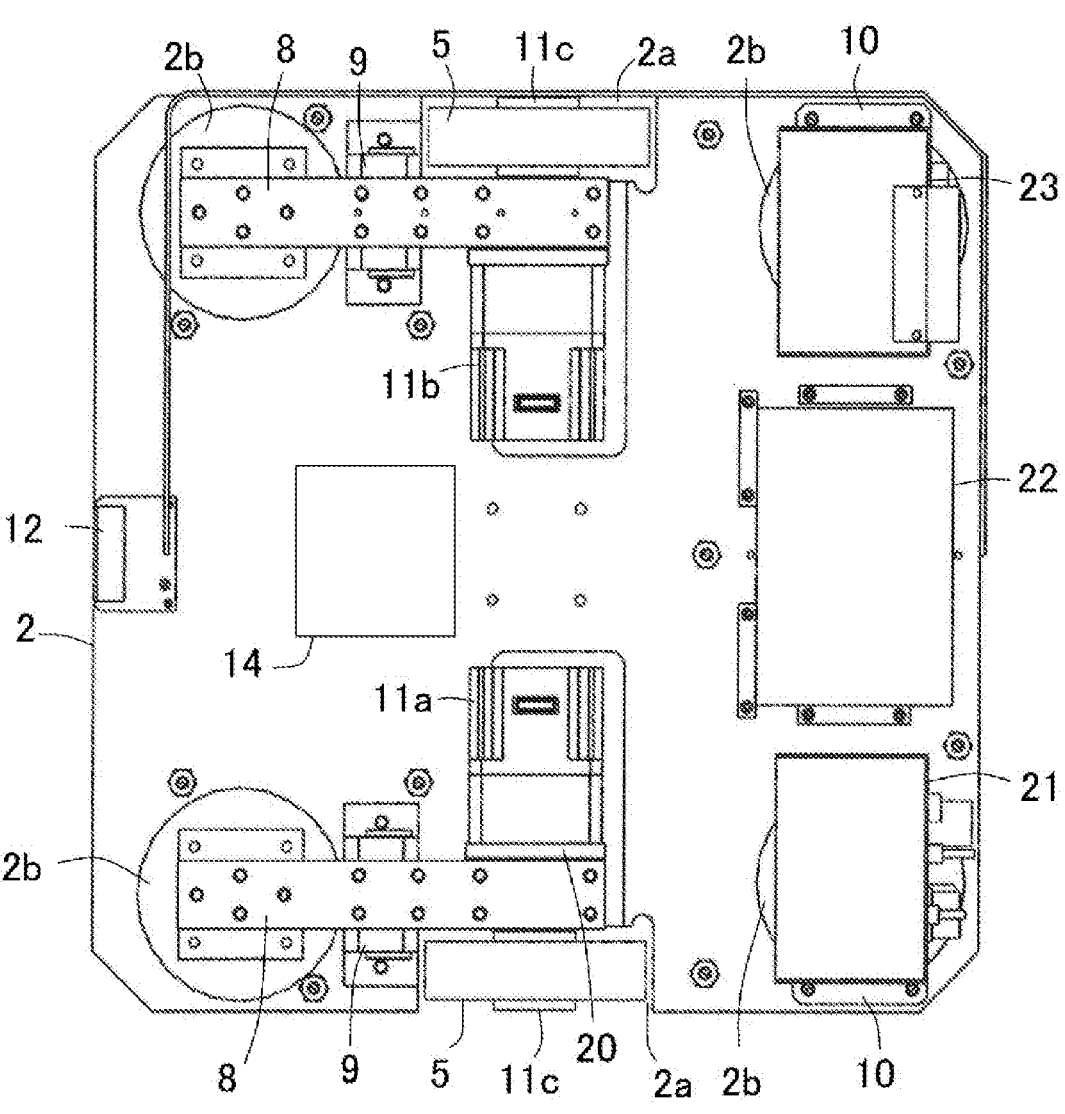
FIG. 6 is a plan view of the unmanned conveying apparatus shown in FIG. 5.
Figure 7:
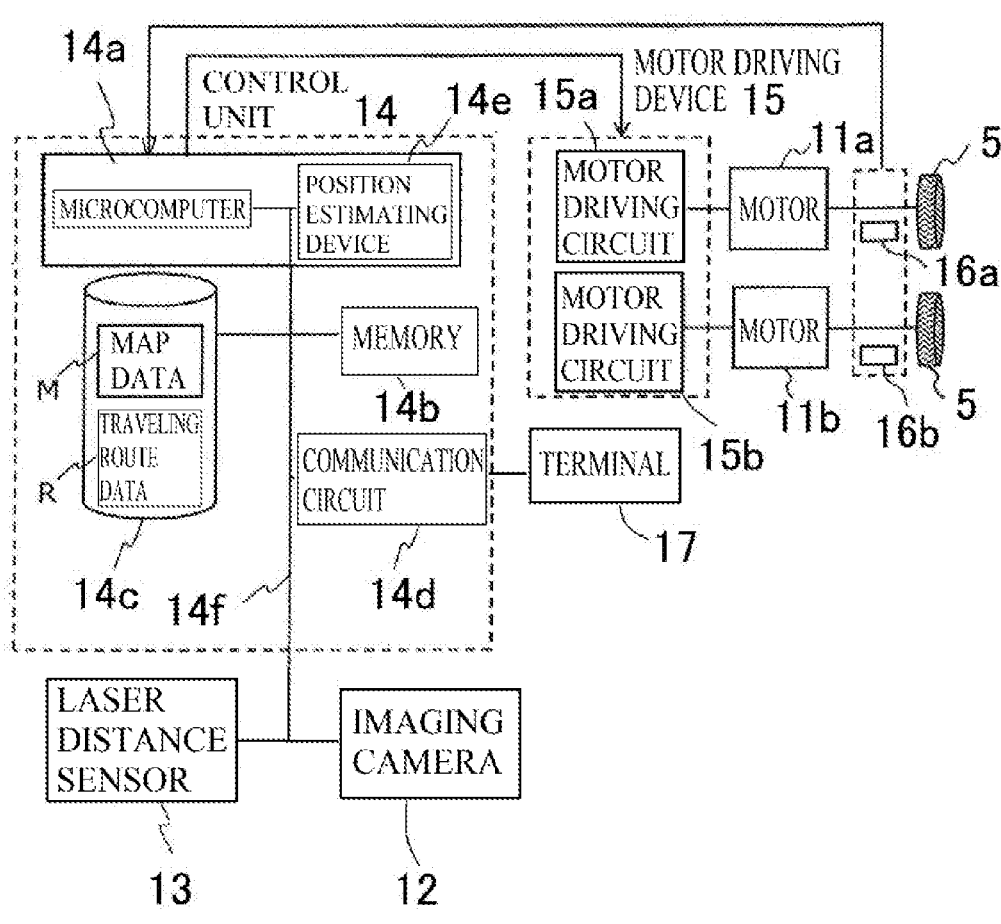
FIG. 7 is a block configuration diagram of a control system of the unmanned conveying apparatus.

As shown in FIG. 6, the base section 2 includes the control unit 14 that calculates, with a predetermined algorithm, a route to a point designated based on map data and sends a driving command, and a motor driving device 15 (a driving unit) that controls the driving of the pair of driving motors 11a, 11b up to the designated point while simultaneously performing own-position estimation and environmental map creation with input data from the imaging camera 12 and the laser distance sensor 13 (see FIG. 7).

In the base section 2, a terminal box 21 including a cable terminal for charging, a battery 22, an LED light 23, and the like are provided.

A control system of the unmanned conveying apparatus 1 is explained with reference to a block configuration diagram of FIG. 7. The control unit 14 includes a microcomputer 14a, a memory 14b, a data storing unit 14c, a communication circuit 14d, and a position estimating device 14e. The microcomputer 14a, the memory 14b, the data storing unit 14c, the communication circuit 14d, and the position estimating device 14e are connected by a communication bus 14f and are capable of exchanging data with one another. The imaging camera 12 and the laser distance sensor 13 are connected to the communication bus 14f via a communication interface (not shown) and transmit measurement data, which are measurement results, to the microcomputer 14a, the position estimating device 14e, and/or the memory 14b.

The microcomputer 14a is a processor or a control circuit (a computer) that performs an arithmetic operation for controlling the operation of the unmanned conveying apparatus 1. Typically, the microcomputer 14a is a semiconductor integrated circuit. The microcomputer 14a transmits a PWM (Pulse Width Modulation) signal, which is a control signal, to the motor driving device 15 to control to drive motor driving circuits 15a, 15b and adjusts voltages applied to the driving motors 11a, 11b. Consequently, each of the pair of driving motors 11a, 11b can be rotated at desired rotating speed. The motor driving circuits 15a, 15b include inverter circuits. Electric currents flowing to the driving motors 11a, 11b are ON/OFF-controlled by the PWM signal transmitted from the microcomputer 14a.

Note that, one or more control circuits (for example, microcomputers) that control driving of the left and right driving motors 11a, 11b may be provided. For example, the motor driving device 15 may include two microcomputers that respectively control the driving of the driving motors 11a, 11b. The two microcomputers may respectively perform coordinate calculation using encoder information output from the rotation sensors 16a, 16b and estimate a moving distance of the unmanned conveying apparatus 1 from an initial position. The two microcomputers may control the motor driving circuits 15a, 15b using the encoder information.

The memory 14b is a volatile storage device that stores a computer program to be executed by the microcomputer 14a. The memory 14b temporarily stores input data and can be used as a work area when the microcomputer 14a and the position estimating device 14e perform arithmetic operations.

The data storing unit 14c is a nonvolatile semiconductor memory device (a database). Note that the data storing unit 14c may be a magnetic recording medium represented by a hard disk or an optical recording medium represented by an optical disk. Further, the data storing unit 14c may include a head device for writing data in and/or reading data from any recording medium and a control device for the head device.

The data storing unit 14c stores an environmental map (map data M) of a moving space in which the unmanned conveying apparatus 1 travels and data of one or a plurality of traveling routes (traveling route data R). The map data M is created when the unmanned conveying apparatus 1 travels in an environmental map creation mode and is stored in the data storing unit 14c at any time. The one or the plurality of traveling route data R are stored in the data storing unit 14c after the map data M is created. The map data M and the traveling route data R are stored in the same data storing unit 14c in this embodiment but may be stored in different data storing units 14c.

The communication circuit 14d is a wireless communication circuit that performs wireless communication conforming to a wireless LAN or a wireless WAN. For example, in the environmental map creation mode for causing the unmanned conveying apparatus 1 to travel and creating an environmental map, the communication circuit 14d performs the wireless communication conforming to the wireless LAN or the wireless WAN and wirelessly communicates with a terminal 17 in a one to one relation. Note that, for example, a tablet computer is used as the terminal 17.

The unmanned conveying apparatus 1 travels along a traveling route determined by the traveling route data R while comparing an environmental map (map data M) created in advance and point group data acquired during traveling and output by the laser distance sensor 13 and estimating a position of the unmanned conveying apparatus 1.

The position estimating device 14e performs creation processing for an environmental map and performs estimation processing for a position of the unmanned conveying apparatus 1 at a load conveyance time. The position estimating device 14e creates map data M (point group data of 3D coordinates) of a moving space according to a traveling position of the unmanned conveying apparatus 1 and a scanning result of the laser distance sensor 13. At the load conveyance time, the position estimating device 14e receives 3D coordinate data from the laser distance sensor 13 and reads the map data M stored in the data storing unit 14c. The position estimating device 14e estimates a position of the unmanned conveying apparatus 1 on the map data M by performing matching of created local map data (point group data of 3D coordinates) with map data M in a wider range.

In this embodiment, the imaging camera 12 images a peripheral environment necessary for performing autonomous traveling and reads a matrix two-dimensional code presented by the operator. Alternatively, an address of a point designated from address information input from the tablet terminal 17 is input to the control unit 14. The control unit 14 checks the address of the designated point on the map data M and determines a traveling route to the designated point with a predetermined algorithm. The control unit 14 sends a driving command to the motor driving device 15 based on the determined traveling route data R.

Note that, when the imaging camera 12 detects an obstacle absent in the map data M, the control unit 14 sends a driving stop command to the motor driving device 15 and causes the driving motors 11a, 11b to stop the driving. After checking a peripheral situation, the control unit 14 retrieves the traveling route data R to a destination again and determines a traveling route. Consequently, it is possible to improve reliability of an autonomous conveying operation of the unmanned conveying apparatus 1.

As explained above, it is possible to provide an unmanned conveying apparatus that achieves low flooring of a vehicle body and enlarges a placing space for a load on the loading section 4 and is capable of stably traveling without the driving wheels 5 rising even if an inclination or unevenness is present on a traveling surface.

Note that the imaging camera 12 may be provided to be movable in the vertical direction and the horizontal direction at predetermined angles. That is, the imaging camera 12 may be moved in the vertical direction and the horizontal direction by a pan tilt device including a tilt mechanism that rotates the imaging camera 12 centering on a tilt axis to perform a tilt operation and a pan mechanism that rotates the imaging camera 12 centering on a pan axis orthogonal to the tilt axis to perform a pan operation.

In this case, the control system may include an angle sensor that detects angles in the vertical direction and the horizontal direction of the imaging camera 12. The control unit 14 may perform, according to the angles acquired by the angle sensor, a setting change for a program for grasping environment.

Consequently, when the imaging camera 12 images a peripheral environment with imaging and the laser distance sensor 13 measures a distance, a map can be created taking into account an offset amount.

Note that an external input to the unmanned conveying apparatus 1 is performed using the terminal 17. However, the external input may be performed using a portable notebook personal computer or a desktop personal computer.

The autonomous conveying apparatus is illustrated as an example of the unmanned conveying apparatus. However, not only this, but the unmanned conveying apparatus may be applied to other apparatuses that perform unmanned conveyance such as an remotely-controlled unmanned tractor or various service robots.

The first wheel supporting section 8 is provided to be swingable with respect to the base section 2. However, the same component as the first wheel supporting section 8 may be applied to the second wheel supporting sections 10. The driving wheels 5 and the second auxiliary wheels 7 may be supported by the second wheel supporting sections 10 swingable with respect to the base section 2.

What is claimed is:

1. An unmanned conveying apparatus that is loaded with a load on a loading section supported by a base section and travels and conveys the load to a designated point, the unmanned conveying apparatus comprising:

a pair of driving wheels driven to rotate by driving motors;

a pair of first auxiliary wheels respectively turnably supported by a first wheel supporting section provided between the loading section and the base section on one end side of the base section centering on the driving wheels; and a pair of second auxiliary wheels respectively turnably supported by a second wheel supporting section provided on another end side of the base section, wherein the first auxiliary wheels are turnably supported on longitudinally one end side of the first wheel supporting section, the driving wheels are respectively rotatably supported on longitudinally another end side of the first wheel supporting section, and the first wheel supporting section is swingably supported by the base section such that a distance L2 from a swinging shaft position to a driving wheel side end position is longer than a distance L1 from the swinging shaft position to a first auxiliary wheel side end position on the first wheel supporting section, and the first wheel supporting section is swingably supported such that a swinging shaft protrudingly provided to a shaft supporting plate protrudingly provided on an opposed surface of the first wheel supporting section, the opposed surface being opposed to the base section, is fitted in a shaft hole of a swing supporting section provided on the base section.

* * * * *